(No Model.) 6 Sheets—Sheet 3.
E. P. DONNELL & F. A. PAUCKNER.
WIRE STITCHING MACHINE.
No. 341,799. Patented May 11, 1886.
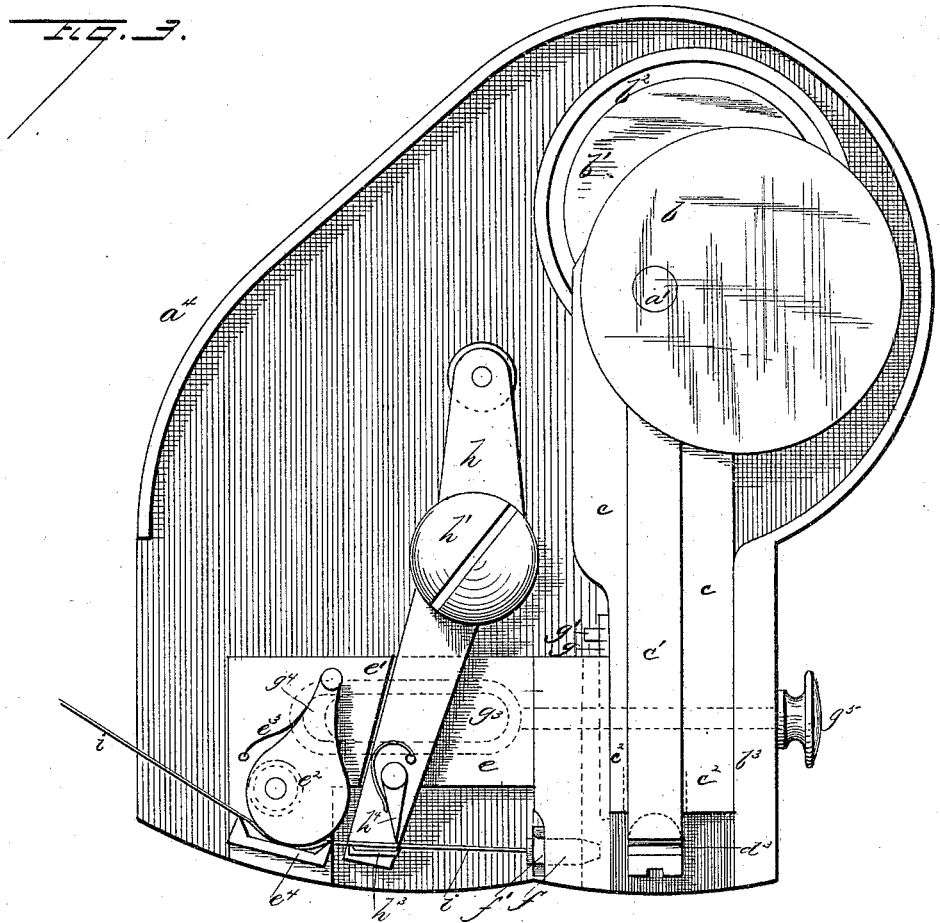
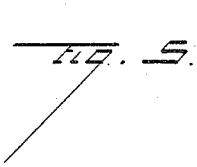
Witnesses:
H. C. McArthur
H. F. McArthur
Inventors:
Edward P. Donnell
Frank A. Pauckner
per
H. Harrison
Attorney.

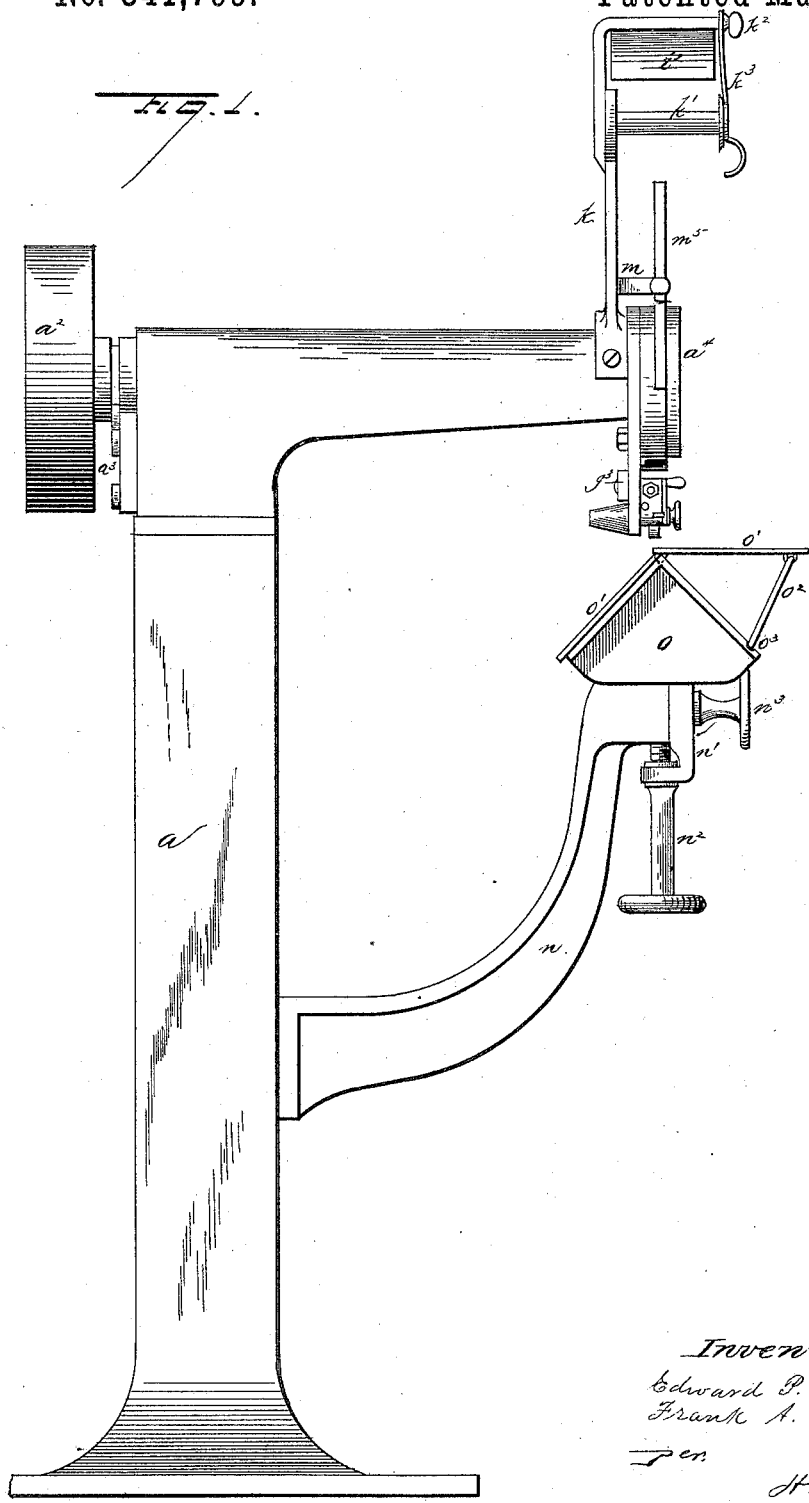

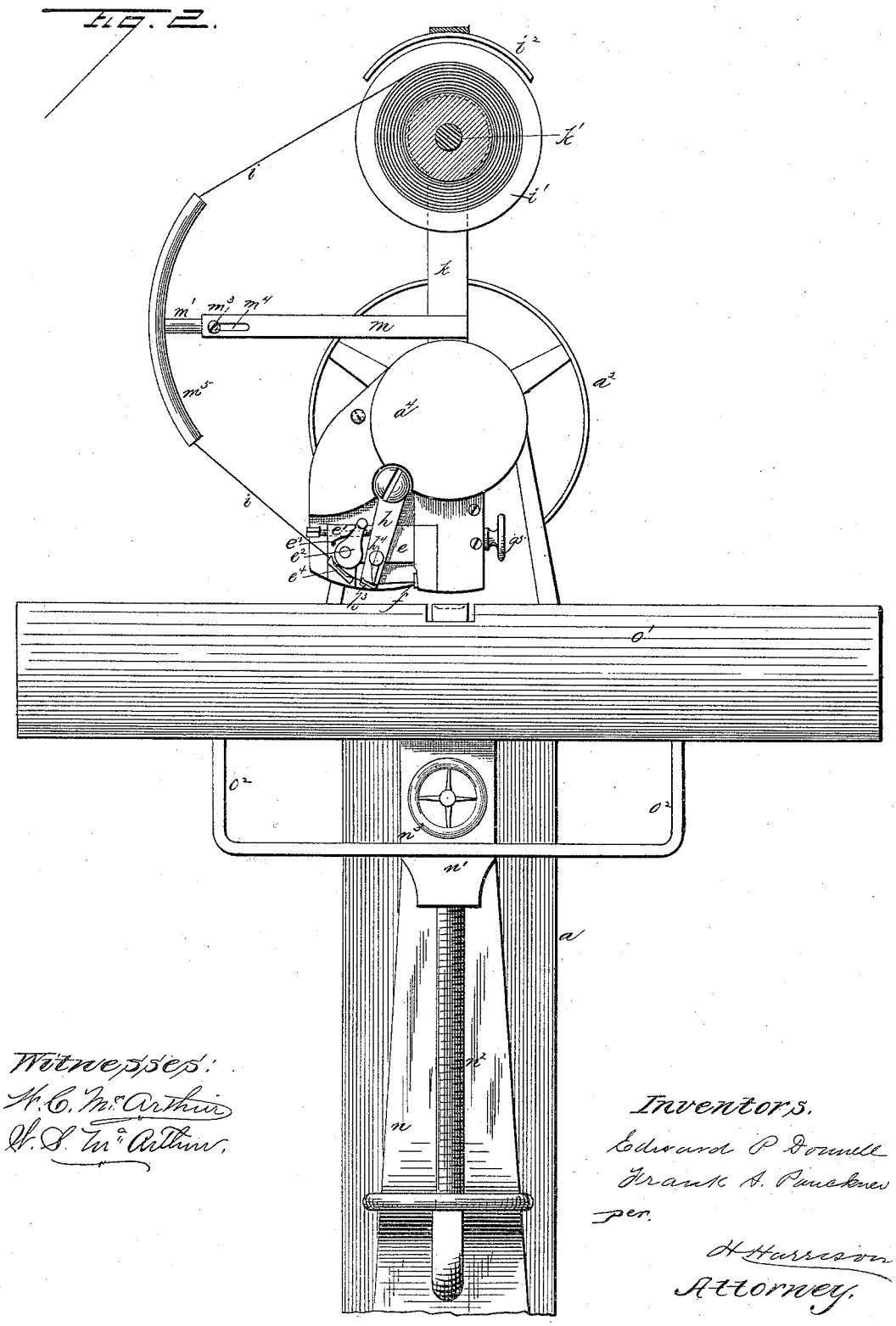

(No Model.) 6 Sheets—Sheet 4.
E. P. DONNELL & F. A. PAUCKNER.
WIRE STITCHING MACHINE.
No. 341,799. Patented May 11, 1886.
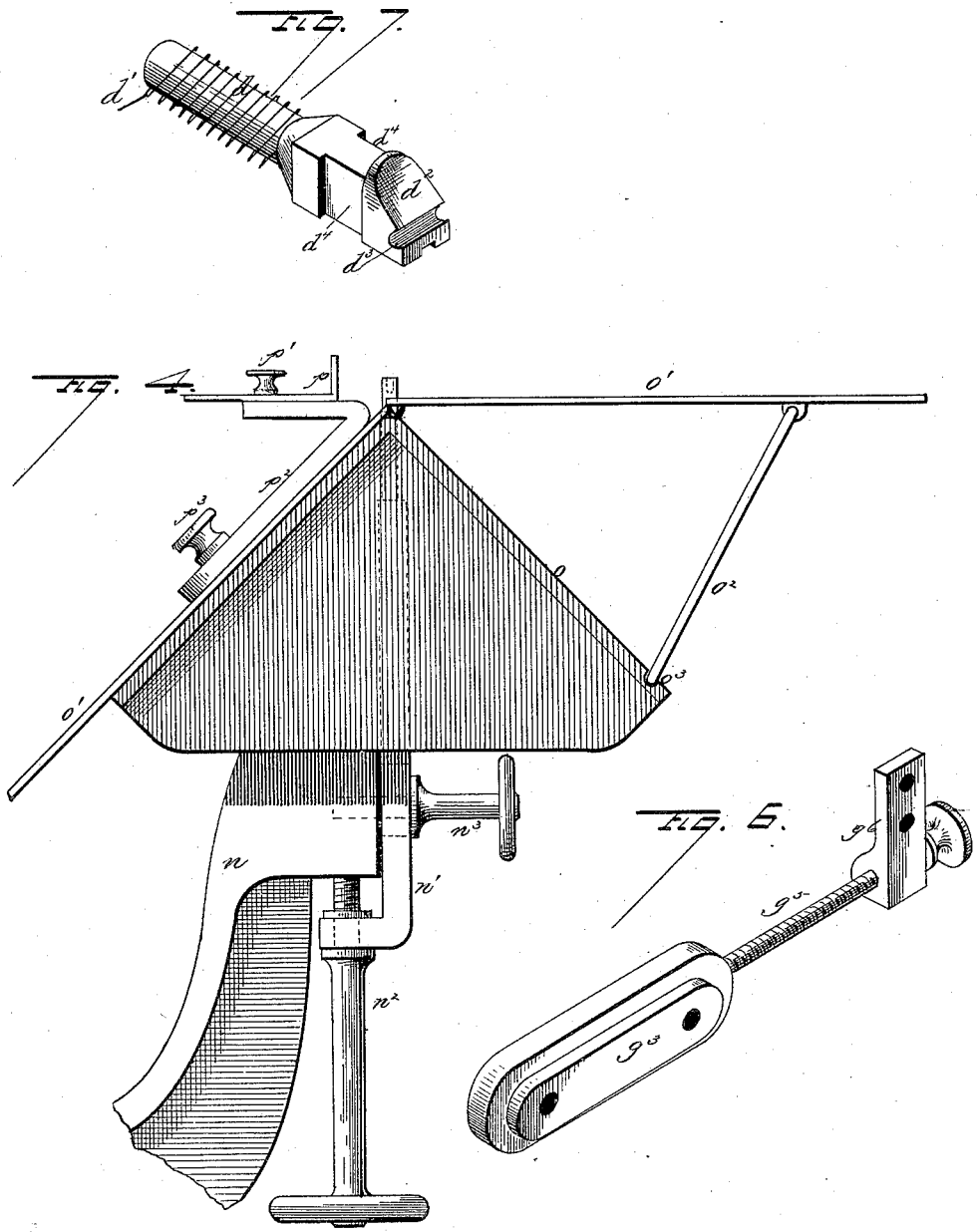

(No Model.) 6 Sheets—Sheet 5.
E. P. DONNELL & F. A. PAUCKNER.
WIRE STITCHING MACHINE.
No. 341,799. Patented May 11, 1886.
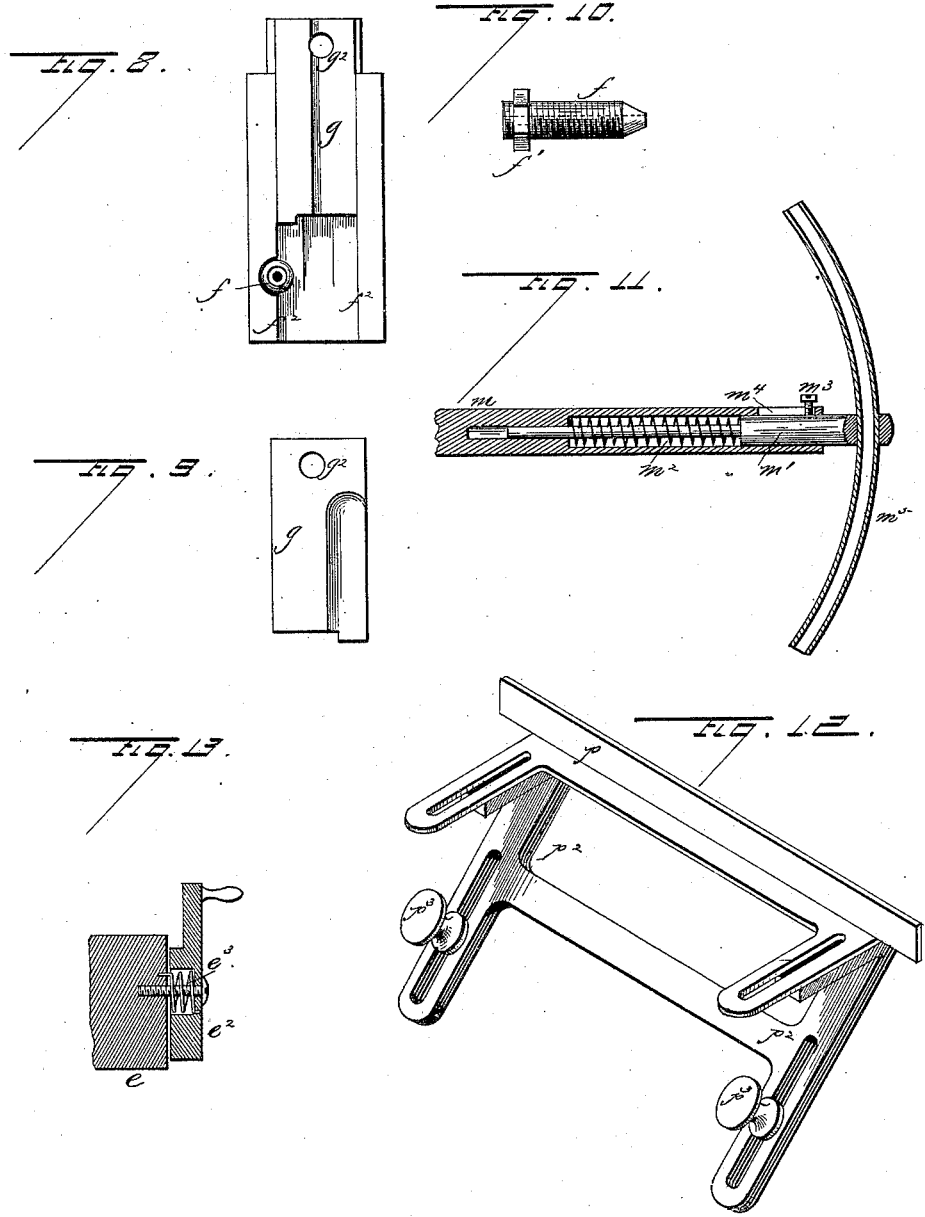

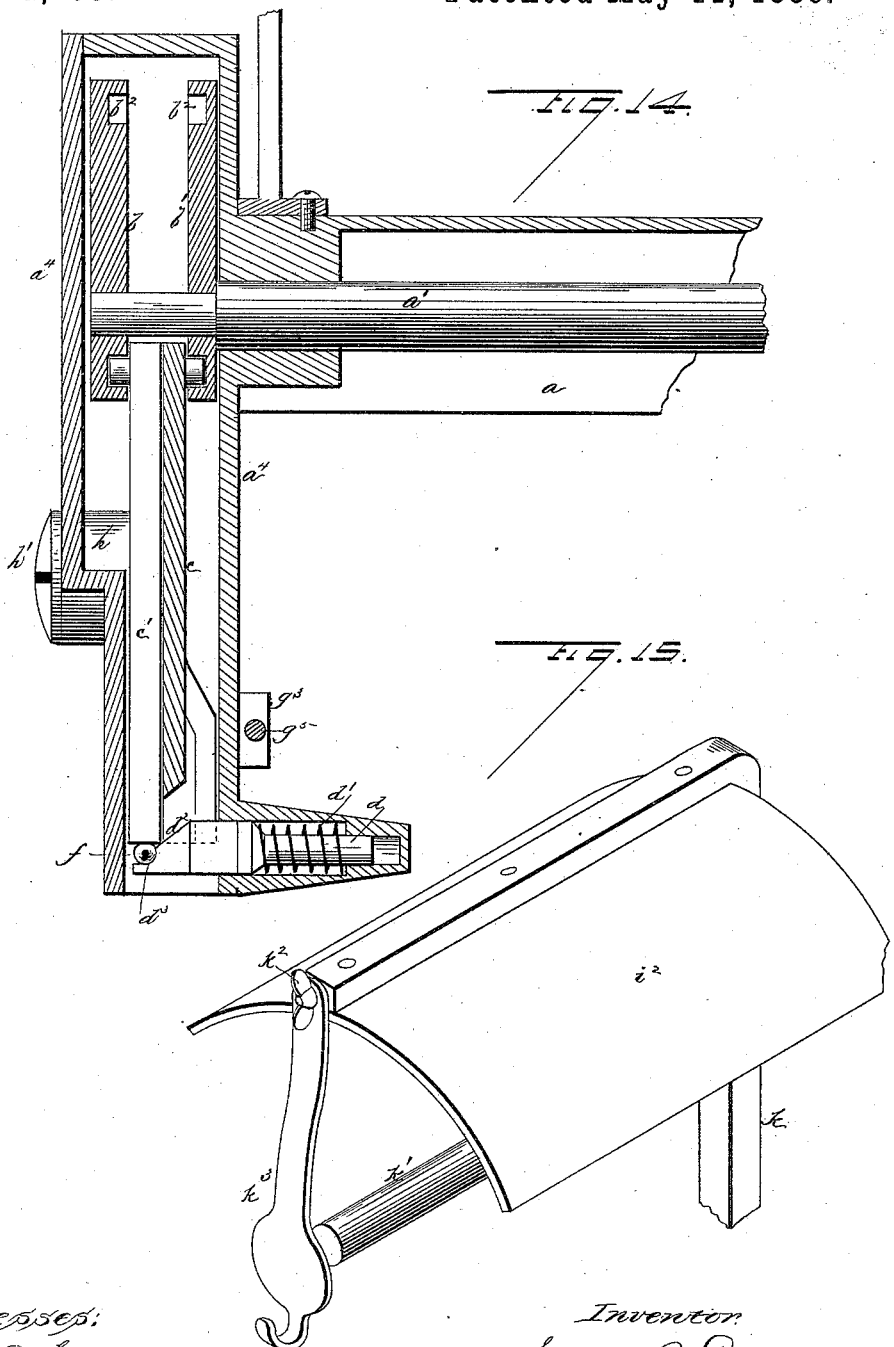

UNITED STATES PATENT OFFICE.

EDWARD P. DONNELL AND FRANK A. PAUCKNER, OF CHICAGO, ILLINOIS; SAID PAUCKNER ASSIGNOR TO SAID DONNELL.

WIRE-STITCHING MACHINE.

SPECIFICATION forming part of Letters Patent No. 341,799, dated May 11, 1886.

Application filed December 9, 1885. Serial No. 185,148. (No model.)

*To all whom it may concern:*

Be it known that we, EDWARD P. DONNELL and FRANK A. PAUCKNER, citizens of the United States, residing at Chicago, in the county of Cook and State of Illinois, have invented certain new and useful Improvements in Wire-Stitching Machines, of which the following is a specification, to wit:

This invention relates to an improvement in book-stapling machines; and it consists in certain peculiarities of the construction and arrangement of the same, substantially as will be hereinafter more fully described and claimed.

In order to enable others skilled in the art to which our invention pertains to make and use the same, we will now proceed to describe its construction and operation, referring to the accompanying drawings, in which—

Figure 1 is a side elevation of our device. Fig. 2 is a front elevation of the same. Fig. 3 is a front view of the head with the face-plate removed. Fig. 4 is an enlarged end view of the adjustable table. Fig. 5 is a detail sectional view of the spring-pivot of the feeding-arm. Fig. 6 is a detail perspective of the slide and screw for adjusting the feed. Fig. 7 is a similar view of the anvil. Fig. 8 is a face view of the wire-cutter and its guide-block. Fig. 9 is a reverse view of the slide. Fig. 10 is a view of the screw-threaded wire-guide tube. Fig. 11 is a sectional view of the yielding-wire guide. Fig. 12 is a view of the work-gage. Fig. 13 is a detail view of the wire-holding eccentric. Fig. 14 is a vertical section of the machine through the main shaft and the bender and driver. Fig. 15 is a detail view of the spool-holder and its tension-spring arm.

$a$ represents the stand or main frame on which the mechanism of the machine is supported. On top of this standard is journaled the main-shaft $a'$, provided on its rear end with a belt-wheel, $a^2$, running loose, and a clutch, $a^3$, for throwing it in and out of gear, as desired. This clutch is of any desired and suitable kind, and need not be more fully described in this connection. This shaft is inclosed in a suitable housing on the main frame, and on its front is the head casing, $a^4$, as shown in the drawings. On the forward end of the main shaft within this casing are secured a pair of eccentric disks, $b\ b'$, the adjacent faces of which are formed with grooves $b^2$, and sliding vertically in suitable guides, $b^3$, of the head is a bending plate or former, $c$, engaged and operated by the groove in the rear disk, $b'$, and in a suitable groove in the face of this former-plate is the plunger or driver $c'$ driven by the groove of the outer disk, $b$. The lower end of the former is bifurcated, having two legs, $c^2$ $c^2$, which embrace the anvil and bend the legs of the staple as the former descends. This anvil is socketed into the head, the rear end or shank $d$ being provided with a spiral spring, $d'$, to force it forward, and the forward or outer end of this anvil is beveled off, as at $d^2$, and provided with a transverse groove, $d^3$, in which the staple lies while being formed. This anvil-head lies just beneath the driver, and is forced back out of the way by the descent of this driver over the beveled end of the anvil, and to limit the backward and forward movement of the anvil and prevent its spring from driving it out we form vertical grooves $d^4$ in the sides of the anvil in which the forming legs $c^2$ lie and move, thus effectually retaining the parts in place.

Within the head, at one side of the former and driver, is a laterally-sliding feed-block, $e$, on the rear end of which is a raised shoulder, $e'$, on which is an eccentric lever, $e^2$, provided with a spring, $e^3$, which forces this lever down upon a ledge or projection, $e^4$, as clearly seen in Figs. 2 and 3, and thereby clamps and holds the wire which passes between the lever and ledge, as shown. The forward end of this feed-block $e$ is provided with a screw-threaded guide-tube, $f$, which has a lock-nut, $f'$, thereon, and is adjusted to suit the operator and take up the wear. The forward face of the block $e$ is formed with a pair of grooved guide-flanges, $f^2$, in which slides vertically the cutter-plate $g$, (shown in detail in Figs. 8 and 9,) and which on its downward stroke cuts off the wire against the end of the guide-tube. This plate is actuated by a pin, $g'$, projecting from the adjacent side of the former, which pin is elongated, as shown, and enters a hole, $g^2$, in the cutting-plate. The feed-block $e$ is secured upon and adjusted by a slide, $g^3$, working in a slot, $g^4$, in the back of the head, as seen by dotted lines in Fig. 3, and this slide is provided with an adjusting-screw, $g^5$, journaled in a small bracket, $g^6$, secured to the head in a convenient position, and by means of which the feed-block and cutting-plate are moved to and from the former-plate to act in regulating the size of the staple, and it will be seen that by the elongation of the pin $g'$ the cutter is always actuated by the former in any position to which it may be adjusted.

The feeding-lever $h$ is pivoted on the head by a pin, $h'$, around which is coiled a spring, $h^2$, one end of which is engaged with the head and the other with the pin, as in Fig. 5. This spring gives the backward motion to the feeding-lever, and its forward or feeding movement is caused by the edge of the disk $b'$ acting on the upper end of said lever, which is provided with a friction-roller to reduce the friction. The lower end of the feed-lever lies over the block $e$, and its backward throw is limited by contact with the shoulder $e'$ of said block, as in Fig. 3, and the lower end of the lever is also provided with a ledge, $h^3$, and gripping spring-pawl $h^4$, to engage and feed forward the wire $i$, as will be at once evident on an inspection of the drawings.

From an arm, $k$, projecting above the head, extends a spindle, $k'$, on which is placed the spool $i'$, containing the wire. A shield, $i^2$, protects the top of this spool from contact with other objects, and on the forward end of this shield is secured, by a clamping-screw, $k^2$, a spring-arm, $k^3$, the end of which bears against the face of the spool with more or less force, to create a friction and give a tension to the wire. This tension is regulated by tightening or loosening the screw, and the spring-arm is swung to one side to admit of changing the spools.

A horizontal arm, $m$, projects from one side of the head, and is formed hollow at its outer end, into which is slipped an arm, $m'$, around which is a spring, $m^2$, to press it out, and a screw, $m^3$, is passed through a slot, $m^4$, of the socketed arm into the other to retain it in position and yet give it a free movement, as in Figs. 2 and 11. The end of the sliding spring-actuated extension $m'$ is provided with a tubular guide, $m^5$, through which the wire is passed, and the slot $m^4$ is of sufficient width to allow of a slight oscillation of the tubular guide as the wire travels from side to side of the spool in being drawn off, while, should catching of the wire or spool occur, the spring-arm is drawn in sufficiently to allow of the feeding of one length or staple, and the pressure of the spring being a yielding one prevents breaking the wire or the slipping of the feeding mechanism.

On an arm or support, $n$, secured to the forward side of the main standard, is a vertical slide, $n'$, lifted and lowered by means of a hand-screw, $n^2$, and provided with a clamping-screw, $n^3$, to secure it solidly after adjustment. The upper end of the slide $n'$ is the clinching-anvil, and is formed on its upper side with a clinching-groove, in the usual and well-known manner. This clincher is immediately below the head, and is adjusted to and from the same in accordance with the thickness of the work under operation.

Supported upon the slide $n'$ is the work-table $o$, which is formed of a ridged or double-inclined casting, which is provided with two leaves or face-plates, $o'$, one or both of which is hinged at the point of the casting, and provided with a hinged supporting-leg, $o^2$, resting, when in use, in a depression, $o^3$, of the main table-casting. Thus when books or pamphlets are to be sewed through the fold, the leaf is dropped and the ridge of the table serves as a guide to retain the work always in proper position for accurate and convenient work. For ordinary work, which is to be stapled through the side, the hinged leaf is lifted, as in Fig. 4, and forms a flat and solid table, on which the work is laid. The inclined rear side of the table is provided with a gage, $p$, which is slotted and provided with set-screws $p'$, by which it is adjustably secured on a small frame, $p^2$, also adjustable by means of slots and thumb-screws $p^3$ upon the inclined table. Thus this gage is set up or down or to and from the work, and is a guide for accurate workmanship when using the flat table, and should both leaves of this table be hinged, as will often be done, it is used as shown in Figs. 4 and 12, where only one leaf is lifted, and where both are lifted the gage $p$ is used without its inclined supporting-frame, as will be fully comprehended at once.

In operation, the work is placed beneath the head and the machine started. The first movement of the disk $b$ causes the feeding-lever to feed in a proper length of wire, which is, by a slight downward motion of the driver, clamped and held in the grooved face of the forming-anvil. This is at once followed by the descent of the bifurcated forming-plate, and with it the cutter, which severs the wire just before the former strikes it. The continued descent of the former bends down the legs of the staple, and finally stops with its lower end resting upon and clamping the work. The driver now descends, first pushing back the forming-anvil to free the staple, and then driving the latter through the work, its points being clinched below during this operation. The driver and former are then both raised to their original position, and the spring-actuated forming-anvil is pressed forward to its proper place to receive a new feed, its grooved sides, engaged by the former, preventing too great a movement in this direction. In the meantime the revolving of the disk $b$ has released the feeding-lever, whose spring throws it back for a fresh feed. In this movement the pawl $h^4$ slides freely over the wire, which is held from being pushed backward by the clamping-eccentric on the feed-block. The same operation is then repeated as often as required by the work. It is evident that both legs of the staple must always be of equal length, and that this length should vary with the thickness of the work through which it is to be forced. The regulation of this, even without stopping the machine, is accomplished by the adjustment of the feed-block. As the forming-anvil is always in the same place, it is evident that if by means of the screw $g^5$ the feed-block $e$ is thrown back the cutter-plate will be drawn with it away from the forming-anvil, and thus lengthen the adjacent leg of the staple to the desired extent. As the backward movement of the feed-lever is limited by the shouldered part of the feed-block, it is at once evident that the shifting of this block also extends the length of wire fed in exactly the same ratio, and this properly lengthens the other staple-leg, and it will be therefore seen that the whole is done at a single operation and without in any manner interfering with the running of the machine.

The working parts of the head are inclosed by a suitable face-plate, and the whole is therefore protected and not liable to be broken or disarranged.

By reference to Fig. 13, it will be seen that the return-spring of the clamping cam or eccentric $e^2$ is socketed into its rear side in the same way described for the feeding-lever, and we thus save space and accidents.

Having thus described our invention, what we claim as new, and desire to secure by Letters Patent, is—

1. In a wire-stapling machine, the combination, with a bifurcated former, of a spring-actuated forming-anvil formed with grooves in its sides, in which the prongs of the former lie to retain the anvil in place, substantially as and for the purpose set forth.

2. In a wire-stapling machine, the combination, with a bifurcated former and a driver lying in its recessed face, of a forming-anvil formed with a beveled face having a transverse wire groove therein, and having vertically-grooved sides to limit its movement, substantially as and for the purpose set forth.

3. In a wire-stapling machine, the combination, with a feeding-lever, of an adjustable block carrying the wire-cutter and provided with a stop which limits the backward throw of the feeding-lever, whereby the size of both legs of the staple is equally and simultaneously regulated, substantially as and for the purpose set forth.

4. In a wire-stapling machine, a sliding block provided with guide-grooves in its end and a wire-guide passing through it, in combination with a cutting-plate sliding in said grooves, and a forming-plate provided with a pin or projection elongated to engage and actuate said cutter in different positions, substantially as and for the purpose set forth.

5. In a wire-stapling machine, the combination, with a cutting-plate sliding in a suitable guide-block, of a hollow screw-threaded guide-nipple screwed through said guide-block and adjustable thereby to proper position with regard to the cutter, substantially as and for the purpose set forth.

6. In a wire-stapling machine, the work-supporting table formed with a double-inclined frame and provided with a hinged leaf adjustable to a horizontal or inclined position, as desired, substantially as and for the purpose set forth.

7. In a wire-stapling machine, the combination, with the double-inclined frame $o$, formed with the notch $o^3$, of the hinged leaf $o'$ and its supporting-leg $o^2$, substantially as and for the purpose set forth.

8. In a wire-stapling machine, the combination, with a double-inclined work-supporting table having an adjustable leaf, of a gage-frame adjustably secured to said table, and a gage adjustably and removably secured on said frame, substantially as and for the purpose set forth.

In testimony whereof we affix our signatures in presence of two witnesses.

EDWARD P. DONNELL.
FRANK A. PAUCKNER.

Witnesses:
W. S. McARTHUR,
JAMES M. FISHER.